United States Patent
Riehl

(10) Patent No.: US 8,747,730 B2
(45) Date of Patent: Jun. 10, 2014

(54) METHOD OF FORMING A WOVEN FIBER STRUCTURE USING A TACKIFIER COMPOSITION

(75) Inventor: John Riehl, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/517,880

(22) Filed: Jun. 14, 2012

(65) Prior Publication Data

US 2012/0267833 A1  Oct. 25, 2012

Related U.S. Application Data

(62) Division of application No. 12/625,936, filed on Nov. 25, 2009.

(51) Int. Cl.
| | |
|---|---|
| *C04B 35/628* | (2006.01) |
| *C04B 35/634* | (2006.01) |
| *C09J 163/00* | (2006.01) |
| *C04B 35/626* | (2006.01) |
| *C04B 35/589* | (2006.01) |
| *C04B 35/80* | (2006.01) |

(52) U.S. Cl.
CPC ............ *C09J 163/00* (2013.01); *C08L 2205/02* (2013.01); *C04B 2235/5256* (2013.01); *C04B 35/62847* (2013.01); *C04B 35/62871* (2013.01); *C04B 35/62886* (2013.01); *C04B 35/6263* (2013.01); *C04B 35/589* (2013.01); *C04B 35/806* (2013.01); *C04B 2235/5252* (2013.01); *C04B 2235/616* (2013.01); *C04B 2235/5244* (2013.01); *C04B 35/62802* (2013.01); *C04B 68/63452* (2013.01); *C04B 2235/524* (2013.01); *C04B 35/6286* (2013.01)

USPC .......................................................... 264/640

(58) Field of Classification Search
USPC .......................................................... 264/640
See application file for complete search history.

(56) References Cited

U.S. PATENT DOCUMENTS

| | | | |
|---|---|---|---|
| 4,741,873 A | 5/1988 | Fischer et al. | |
| 4,780,432 A | 10/1988 | Minford et al. | |
| 4,829,134 A | 5/1989 | Sakamoto et al. | |
| 5,053,362 A | 10/1991 | Chi et al. | |
| 5,116,398 A | 5/1992 | Prewo | |
| 5,279,892 A | 1/1994 | Baldwin et al. | |

(Continued)

FOREIGN PATENT DOCUMENTS

| | | |
|---|---|---|
| EP | 1097959 | 5/2001 |
| EP | 1640352 | 3/2006 |

(Continued)

OTHER PUBLICATIONS

Extended European Search Report dated Feb. 14, 2011.

*Primary Examiner* — Joseph S Del Sole
*Assistant Examiner* — Russell Kemmerle, III
(74) *Attorney, Agent, or Firm* — Carlson, Gaskey & Olds, P.C.

(57) ABSTRACT

A method of forming a woven fiber structure for a molding process to produce a ceramic matrix composite, includes depositing a tackifier composition having a carrier solvent, a resin material, and an inorganic filler onto at least a portion of a woven fiber structure; drying the tackifier composition on woven fiber structure to remove at least a portion of the carrier solvent from the tackifier composition; and forming the dried woven fiber structure into a preform.

13 Claims, 1 Drawing Sheet

(56) References Cited

U.S. PATENT DOCUMENTS

| | | | |
|---|---|---|---|
| 5,393,215 A | 2/1995 | Donovan, Sr. | |
| 5,447,785 A * | 9/1995 | Kishi et al. | 442/60 |
| 5,552,215 A | 9/1996 | Tredway et al. | |
| 5,593,758 A | 1/1997 | Lopez et al. | |
| 5,729,970 A | 3/1998 | Atmur et al. | |
| 6,314,858 B1 * | 11/2001 | Strasser et al. | 89/36.02 |
| 6,447,705 B1 | 9/2002 | Fowler et al. | |
| 6,743,393 B1 * | 6/2004 | Petrak | 264/625 |
| 2003/0203174 A1 | 10/2003 | McCarthy et al. | |
| 2005/0093188 A1 | 5/2005 | Forest et al. | |
| 2007/0007678 A1 * | 1/2007 | Benitsch | 264/29.1 |

FOREIGN PATENT DOCUMENTS

| | | |
|---|---|---|
| GB | 2252315 | 8/1992 |
| JP | 8027699 | 1/1996 |
| JP | 2003183416 | 7/2003 |

* cited by examiner

METHOD OF FORMING A WOVEN FIBER STRUCTURE USING A TACKIFIER COMPOSITION

CROSS REFERENCE TO RELATED APPLICATION

This is a divisional application of U.S. patent application Ser. No. 12/625,936, filed on Nov. 25, 2009.

STATEMENT REGARDING FEDERALLY SPONSORED RESEARCH

The U.S. Government may have certain rights in this disclosure, as provided for under Contract No. N00019-02-C-3003 awarded by the United States Navy.

BACKGROUND

This disclosure relates to woven fiber structures for molding processes that may be used to produce ceramic matrix composites.

Tackifiers are known and used in polymer matrix composites to hold a fiber structure in a desired shape. As an example, a fiber structure alone may be pliable but does not readily hold the shape to which it is deformed. The tackifier is therefore applied to the fiber structure to facilitate holding that shape while permitting the structure to be deformed into the desired shape. The tackifier may also be used to attach woven fiber sheets together and facilitate handling of the fiber structure.

SUMMARY

According to an exemplary aspect of the present disclosure, a method of forming a woven fiber structure for a molding process to produce a ceramic matrix composite includes depositing a tackifier composition having a carrier solvent, a resin material, and an inorganic filler onto at least a portion of a woven fiber structure; drying the tackifier composition on woven fiber structure to remove at least a portion of the carrier solvent from the tackifier composition; and forming the dried woven fiber structure into a preform.

A further non-limiting example includes depositing a preceramic polymer into the preform to form a green state composite.

A further non-limiting example of any of the foregoing examples includes pyrolyzing the preceramic polymer to form a ceramic matrix.

A further non-limiting example of any of the foregoing examples includes heating the green state composite to pyrolyze the preceramic polymer and remove the resin material from the tackifier composition, with the inorganic filler remaining in the green state composite.

In a further non-limiting example of any of the foregoing examples, the inorganic filler is a ceramic material.

In a further non-limiting example of any of the foregoing examples, the ceramic material is selected from a group consisting of carbides, nitrides, oxides, and combinations thereof.

In a further non-limiting example of any of the foregoing examples, the ceramic material is silicon nitride.

In a further non-limiting example of any of the foregoing examples, the resin material includes an epoxy resin.

In a further non-limiting example of any of the foregoing examples, the resin material includes at least two different types of epoxy resins.

In a further non-limiting example of any of the foregoing examples, one of the epoxy resins has an epoxy equivalent weight of 175-200 g/eq and another of the epoxy resins has an epoxy equivalent weight of 500-575 g/eq.

In a further non-limiting example of any of the foregoing examples, the inorganic filler is a ceramic material and the resin material includes an epoxy resin.

In a further non-limiting example of any of the foregoing examples, the tackifier composition includes 22-42 wt. % of the resin material, 1-30 wt. % of the inorganic filler, and the remainder being the carrier solvent.

In a further non-limiting example of any of the foregoing examples, the tackifier composition includes 27-37 wt. % of the resin material, 18-28 wt. % of the inorganic filler, and the remainder being the carrier solvent.

In a further non-limiting example of any of the foregoing examples, the tackifier composition includes 30-34 wt. % of the resin material, 21-25 wt. % of the inorganic filler, and the remainder being the carrier solvent.

In a further non-limiting example of any of the foregoing examples, the woven fiber structure has ceramic fibers.

In a further non-limiting example of any of the foregoing examples, the ceramic fibers are silicon carbide.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
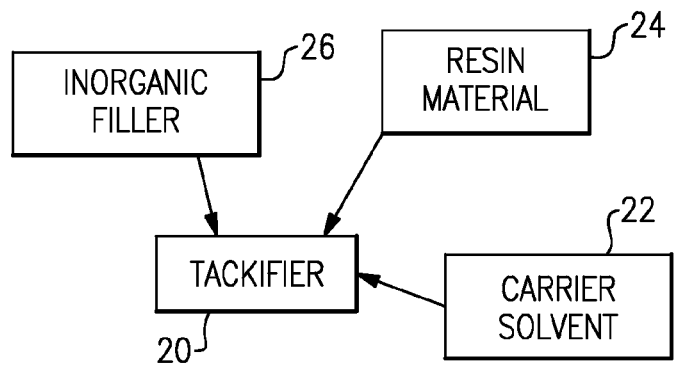
FIG. 1 illustrates an example tackifier composition.

FIG. 1 schematically illustrates an example of tackifier composition 20 that may be used in a molding process to produce a ceramic matrix composite ("CMC"). As will be described, the disclosed tackifier composition 20 is designed to be physically and chemically compatible with the ceramic materials and ceramic processing used to form all types of CMC articles. Ceramic materials are often processed at much higher temperatures than polymer matrix composites and are also subject to shrinkage during thermal processing of the ceramic material. Tackifiers used in polymeric composite systems with lower processing temperatures may thermally degrade under the high temperatures used for ceramic processing and thereby exacerbate effects from shrinkage and/or produce residual degradation byproducts that negatively affect the properties of the CMC. The disclosed tackifier composition 20 is designed to facilitate mitigating such concerns and is universally compatible with all different types of CMC articles.

In the illustrated example, the tackifier composition 20 includes the components of a carrier solvent 22, a resin material 24, and an inorganic filler 26. The components 22, 24, and 26 may be mixed together in predetermined amounts to form the tackifier composition 20. In some examples, the tackifier composition 20 may include only the given components along with impurities that do not materially affect the tack properties. The tack properties may refer generally to the ability of the tackifier composition 20 to facilitate forming a fiber structure into a preform, ability to bond fiber structures together, and/or ability to enhance handling characteristics of a fiber structure.

The carrier solvent 22 is a liquid that facilitates depositing the tackifier composition 20 onto a woven fiber structure, as will be described later in this disclosure. As an example, the carrier solvent 22 may be an organic solvent, such as acetone. Other types of organic solvents, such as polar or non-polar solvents, may alternatively be used depending upon the type of resin material 24, for instance.

The resin material 24 may be selected to have desirable tack properties that facilitate forming and holding a woven fiber structure in a preform, facilitate bonding fiber structures together, and/or enhance handling characteristics of a fiber structure. As an example, the resin material 24 may be an epoxy resin, which provides better tack properties than pre-ceramic polymers that may be used to form the CMC. Thus, unlike polymer matrix composites that utilize tackifiers that are chemically similar to the polymer matrix, the resin of the tackifier composition 20 may be chemically and physically different than a preceramic polymer used to form the matrix. Additionally, the epoxy material can be cleanly removed in a later ceramic processing heating step to leave little or no residue that might otherwise affect the physical, chemical, mechanical, or electrical characteristics of the final CMC. In this regard, portions of the tackifier composition 20 are sacrificial in that the tackifier composition 20 is used with the woven fiber structure to provide tack properties but is then at least partially removed after serving this function.

The resin material 24 may include a single type of resin or a blend of two or more different types of resins. For instance, a first epoxy resin may have weak tack properties and a second epoxy resin in the blend may have strong tack properties such that a blend of the two different epoxy resins provides a desirable composite tack property. For instance, one of the resins may be D.E.R. 331 (Dow Chemical Company) and the other resin may be Epon 1001F (Shell Oil Company). The epoxy resins may be further characterized by an epoxy equivalent weight or other property. In this regard, one of the epoxy materials may have an epoxy equivalent weight of 175-200 g/eq and another epoxy material used in the blend may have an epoxy equivalent weight of 500-575 g/eq. Given this description, one of ordinary in the art will recognize other types or blends of epoxy resins, or even other types of resins that may be used in the tackifier composition 20.

The inorganic filler 26 of the tackifier composition 20 may be a ceramic material, such as a carbide, nitride, oxide, or combination thereof. That is, the ceramic material may be a blend of several different types of ceramic powders or a single type of material that includes nitrogen, carbon, and/or oxygen. In one example, the ceramic material may be silicon nitride ($Si_3N_4$) powder. As will be described below, the inorganic filler 26 facilitates mitigating effects from shrinkage during the processing of the CMC.

The components of the tackifier composition 20 may be provided in predetermined amounts. In one example, the tackifier composition 20 includes 22-42 wt. % of the resin material 24, 1-30 wt. % of the inorganic filler 26, and the remainder being the carrier solvent 22. In further examples, the tackifier composition 20 may include 27-37 wt. % of the resin material 24, 18-28 wt. % of the inorganic filler 26, and the remainder being the carrier solvent 22. In a further example, the tackifier composition 20 may include 30-34 wt. % of the resin material 24, 21-25 wt. % of the inorganic filler 26, and the remainder of the carrier solvent 22. That is, the amounts of the components may be adjusted within the given example ranges to provide the tackifier composition 20 with desirable properties with regard to tack, viscosity, and ability to be cleanly removed during ceramic processing.

Figure 2:
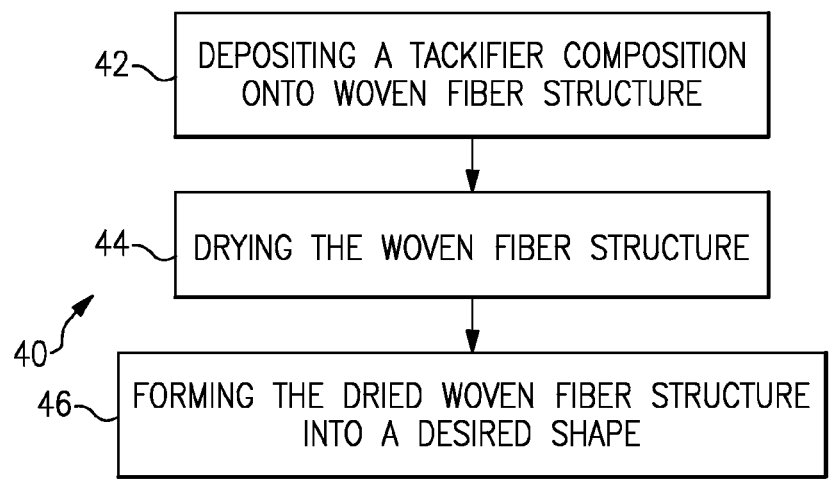
FIG. 2 illustrates an example method of forming a woven fiber structure using a disclosed tackifier composition.

FIG. 2 illustrates selected steps of an example method 40 of forming a woven fiber structure for a molding process to produce a CMC using the above-described tackifier composition 20. In this example, the method 40 includes a deposition step 42, a drying step 44, and a forming step 46. The deposition step 42 may include depositing the tackifier composition 20 onto at least a portion of the woven fiber structure, which may be a two-dimensional broadcloth fiber structure, three dimensional fiber structure, or combination thereof. As an example, the tackifier composition 20 may be applied to surfaces of individual sheets of broadcloth, such as sheets of eight harness satin weave. The woven fiber structure is therefore generally not limited to any particular type of structure. Additionally, the tackifier composition 20 is universally applicable to different types of CMC articles and the fibers of the woven fiber structure may therefore be any type of ceramic material desired in the final composition of the CMC. In one example, the fibers may be silicon carbide (SiC), such as cg-Nicalon (Nippon Carbon Company Limited). However, in other examples, the fibers may be other types of carbides, nitrides, oxides, or combinations thereof.

The tackifier composition 20 may be deposited onto the surfaces of the woven fiber structure (e.g., surfaces of an individual sheet). In this regard, the tackifier composition 20 may be applied only to the surfaces or surface of a sheet or fiber structure and need not necessarily cover all surfaces of the fibers. As an example, the tackifier composition 20 may be spray-deposited onto the woven fiber structure, melt-infused onto the woven fiber structure in a pressure/heat transfer process, or combinations of these techniques. Moreover, the amounts of the components in the tackifier composition 20 may be adjusted to better suit a particular desired deposition technique, such as to achieve a desired viscosity.

After deposition, the tackifier composition 20 on the woven fiber structure or sheet is dried in the drying step 44 to remove a substantial portion of the carrier solvent 22. For instance, the carrier solvent 22 may evaporate and/or the woven fiber structure or sheet may be subjected to heat and/or reduced pressure to remove a substantial portion of, or all of, the carrier solvent 22 from the tackifier composition 20 by evaporation. In the case of a sheet, the sheet may then be cut into predefined shapes or plies. For example, the sheet may be held flat and cut into patterns. The handling characteristics of the tackifier composition 20 facilitate maintaining the shape and edge integrity of the patterns during cutting and handling.

The dried woven fiber structure or cutout patterns may then be formed in the forming step 46 into a preform. For instance, the cutout patterns may be stacked, such as on a layup mandel having a shape corresponding to the geometry of the part. During stacking, the tackifier composition 20 enables the cutout patterns to stick together as the preform is built up from the cutout patterns. Heat and pressure may be applied during the forming or stacking to compact the preform, form a desired shape, and/or to partially polymerize the resin material 24 in the preform. Alternatively, the forming of the fiber preform may be conducted at ambient temperatures with limited or no polymerization. In this regard, the resin material 24 may be free of any catalyzing agent if no polymerization is desired or may include a low level of catalyzing agent if partial polymerization is desired.

Three-dimensional woven structures may also be incorporated with the woven fiber structure or cutout patterns. For instance, the tackifier composition 20 may also be applied to the surfaces of the three-dimensional woven structure that mate with the woven fiber structure or cutout patterns to facilitate holing the structures together.

After the formation of the woven fiber structure into the desired shape, the preform may be subjected to a molding process for forming the CMC. For instance, the molding process may be a resin transfer molding process in which a material, such as a preceramic polymer, is infiltrated into the spaces between the fibers of the fiber preform. The preceramic polymer and fiber preform thereby form a green state composite. The green state composite may be then subjected to heating steps to polymerize and pyrolyze the preceramic polymer to form the CMC. Multiple cycles of infusing the preceramic polymer and pyrolyzing the preceramic polymer may be used to achieve a fully dense matrix.

As an example, the preceramic polymer may be a polysilazane for forming a silicon-containing ceramic matrix, such as amorphous silicon carbonitride (SiNC) using S-200 (COI Ceramics, Inc.). It is to be understood that the tackifier composition 20 is universally compatible and may therefore be used with other types of preceramic polymers.

The heating of the green state composite to form the CMC also removes the resin material 24. For instance, the processing of ceramic materials results in shrinkage as the preceramic polymer pyrolyzes and densifies into ceramic material. Shrinkage of preceramic polymers can be approximately 40 vol %. To reduce effects of shrinkage, such as a tendency of the composite to crumble or fracture from lack of mechanical strength, the tackifier composition 20 includes the inorganic filler 26. The inorganic filler 26 does not thermally decompose during the heating and thereby remains as a stable reinforcing agent to increase the mechanical strength of the composite during processing. Thus, the inorganic filler 26 facilitates processing of the CMC whereas tackifiers without inorganic filler would not provide any reinforcing effect.

Figure 3:
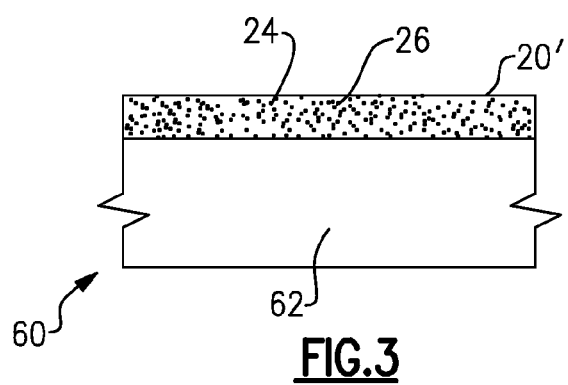
FIG. 3 illustrates an example woven fiber structure using a disclosed tackifier composition.

FIG. 3 illustrates an example cross-section of a dried woven fiber structure 60 after the drying step 44 of the method 40. In this example, the dried woven fiber structure 60 includes a fiber structure 62, which may be a sheet or sheets of woven fiber, such as eight harness satin weave of cg-Nicalon. The dried woven fiber structure is coated on one or both sides with dried tackifier composition 20'. The dried tackifier composition 20' may be substantially free of any of the carrier solvent 22 after the drying step 44. Thus, all that remains of the original tackifier composition 20 are particles of the inorganic filler 26 dispersed within the resin material 24. In some examples, the dried woven fiber structure 60 may be pre-prepared for a later molding process to fabricate the CMC.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of forming a woven fiber structure for a molding process to produce a ceramic matrix composite, comprising:
   a) depositing a tackifier composition having a carrier solvent, a resin material, and an inorganic filler onto at least a portion of a woven fiber structure, wherein the resin material includes at least two different types of epoxy resins, and one of the epoxy resins has an epoxy equivalent weight of 175-200 g/eq and another of the epoxy resins has an epoxy equivalent weight of 500-575 g/eq;
   b) drying the tackifier composition on woven fiber structure to remove at least a portion of the carrier solvent from the tackifier composition; and
   c) forming the dried woven fiber structure into a preform.

2. The method as recited in claim 1, further including depositing a preceramic polymer into the preform to form a green state composite.

3. The method as recited in claim 2, further including pyrolyzing the preceramic polymer to form a ceramic matrix.

4. The method as recited in claim 2, further including heating the green state composite to pyrolyze the preceramic polymer and remove the resin material from the tackifier composition, with the inorganic filler remaining in the green state composite.

5. The method as recited in claim 1, wherein the inorganic filler is a ceramic material.

6. The method as recited in claim 5, wherein the ceramic material is selected from a group consisting of carbides, nitrides, oxides, and combinations thereof.

7. The method as recited in claim 5, wherein the ceramic material is silicon nitride.

8. The method as recited in claim 1, wherein the inorganic filler is a ceramic material and the resin material includes an epoxy resin.

9. The method as recited in claim 1, wherein the tackifier composition includes 22-42 wt. % of the resin material, 1-30 wt. % of the inorganic filler, and the remainder being the carrier solvent.

10. The method as recited in claim 1, wherein the tackifier composition includes 27-37 wt. % of the resin material, 18-28 wt. % of the inorganic filler, and the remainder being the carrier solvent.

11. The method as recited in claim 1, wherein the tackifier composition includes 30-34 wt. % of the resin material, 21-25 wt. % of the inorganic filler, and the remainder being the carrier solvent.

12. The method as recited in claim 1, wherein the woven fiber structure has ceramic fibers.

13. The method as recited in claim 12, wherein the ceramic fibers are silicon carbide.

* * * * *